United States Patent [19]

Takemi et al.

[11] Patent Number: 4,570,450

[45] Date of Patent: Feb. 18, 1986

[54] APPARATUS FOR CONTROLLING AUTOMOTIVE AIR CONDITIONERS

[75] Inventors: Akio Takemi, Kariya; Akiro Yoshimi, Oobu; Takayoshi Kawai, Toyohashi, all of Japan

[73] Assignee: Nippondenso Co., Ltd., Kariya, Japan

[21] Appl. No.: 561,514

[22] Filed: Dec. 14, 1983

[30] Foreign Application Priority Data

Dec. 14, 1982 [JP] Japan ................. 57-219642

[51] Int. Cl.$^4$ ........................ F25B 5/00; F25B 41/00
[52] U.S. Cl. ...................................... 62/199; 62/203; 62/228.5; 62/243
[58] Field of Search ............... 62/196.2, 228.5, 215, 62/243, 244, 199, 203; 236/1 EA; 165/22

[56] References Cited

U.S. PATENT DOCUMENTS

| | | | |
|---|---|---|---|
| 2,245,053 | 6/1941 | Sanders, Jr. .................... | 62/199 X |
| 4,358,936 | 11/1982 | Ito et al. ........................ | 165/43 X |
| 4,364,513 | 12/1982 | Tsuzuki et al. ................. | 236/49 |
| 4,408,712 | 10/1983 | Naganoma et al. ............. | 165/43 X |
| 4,417,688 | 11/1982 | Schnaibel et al. .............. | 237/2 A X |

Primary Examiner—Harry Tanner
Attorney, Agent, or Firm—Cushman, Darby & Cushman

[57] ABSTRACT

Apparatus for controlling an automotive air conditioner comprises first and second air distribution passageways in which blower fans are provided to direct air streams respectively therethrough to first and second areas of a passenger compartment. First and second evaporators located in the first and second passageways respectively are supplied with working fluid to transfer thermal energy from the first and second air streams to the supplied working fluid. A control unit is responsive to the temperatures of the first and second areas and temperature settings for estimating thermal energies of the first and second air streams to be delivered from the passageways and derives first and second control signals from the estimated thermal energies to control actuators which individually regulate the flow rates of the working fluid supplied to the first and second evaporators.

5 Claims, 5 Drawing Figures

APPARATUS FOR CONTROLLING AUTOMOTIVE AIR CONDITIONERS

BACKGROUND OF THE INVENTION

The present invention relates generally to electronically controlled automotive air conditioners, and in particular to an automotive air conditioner having a variable capacity compressor, a plurality of evaporators and a plurality of refrigerant flow regulators for independently controlling the temperatures of a plurality of areas within a vehicle passenger compartment in response to thermal loads of the compartment areas.

It is known in the art to independently control a plurality of areas of a vehicle compartment. One prior art system is known as a dual air conditioner having two air distribution conduits, or subsystems, one at the front of the vehicle compartment and the other at the rear thereof and each exhaust duct includes an evaporator therein.

While the front distribution subsystem is designed as a main part of the conditioner, the rear distribution subsystem is usually provided as an optional item to the vehicle owner and installed as an auxiliary part of the conditioner. The evaporator of the front distribution subsystem is directly coupled with the source of refrigerant, whereas the evaporator of the rear subsystem is coupled through an electromagnetically controlled regulating valve. This prevents the refrigerant from being supplied exclusively to the rear-side evaporator and difficulties occur in controlling the individual flow rates when there is a difference in thermal load between the front and rear subsystems.

SUMMARY OF THE INVENTION

Accordingly, an object of the present invention is to provide an apparatus for controlling an automotive air conditioner capable of independently controlling the temperatures of different areas of a passenger compartment.

Another object of the invention is to provide an air conditioner control apparatus which enables the conditioner to operate at small power consumption.

The apparatus comprises first and second air distribution passageways in which blower fans are provided to direct air streams respectively therethrough to first and second areas of the passenger compartment. First and second evaporators are located in the distribution passageways respectively and are supplied with refrigerant at variable flow rates to transfer thermal energy from the first and second air streams to the refrigerant. A control unit is responsive to the temperatures of the first and second areas and to the reference temperature settings, for estimating thermal energies of the first and second air streams to be delivered from the passageways, and derives first and second control signals from the estimated thermal energies. The first and second control signals are applied to actuators to individually control the flow rates of the refrigerant supplied to the first and second evaporators.

BRIEF DESCRIPTION OF THE DRAWINGS

The present invention will be described in further detail with reference to the accompanying drawings, in which.

DETAILED DESCRIPTION

Figure 1:
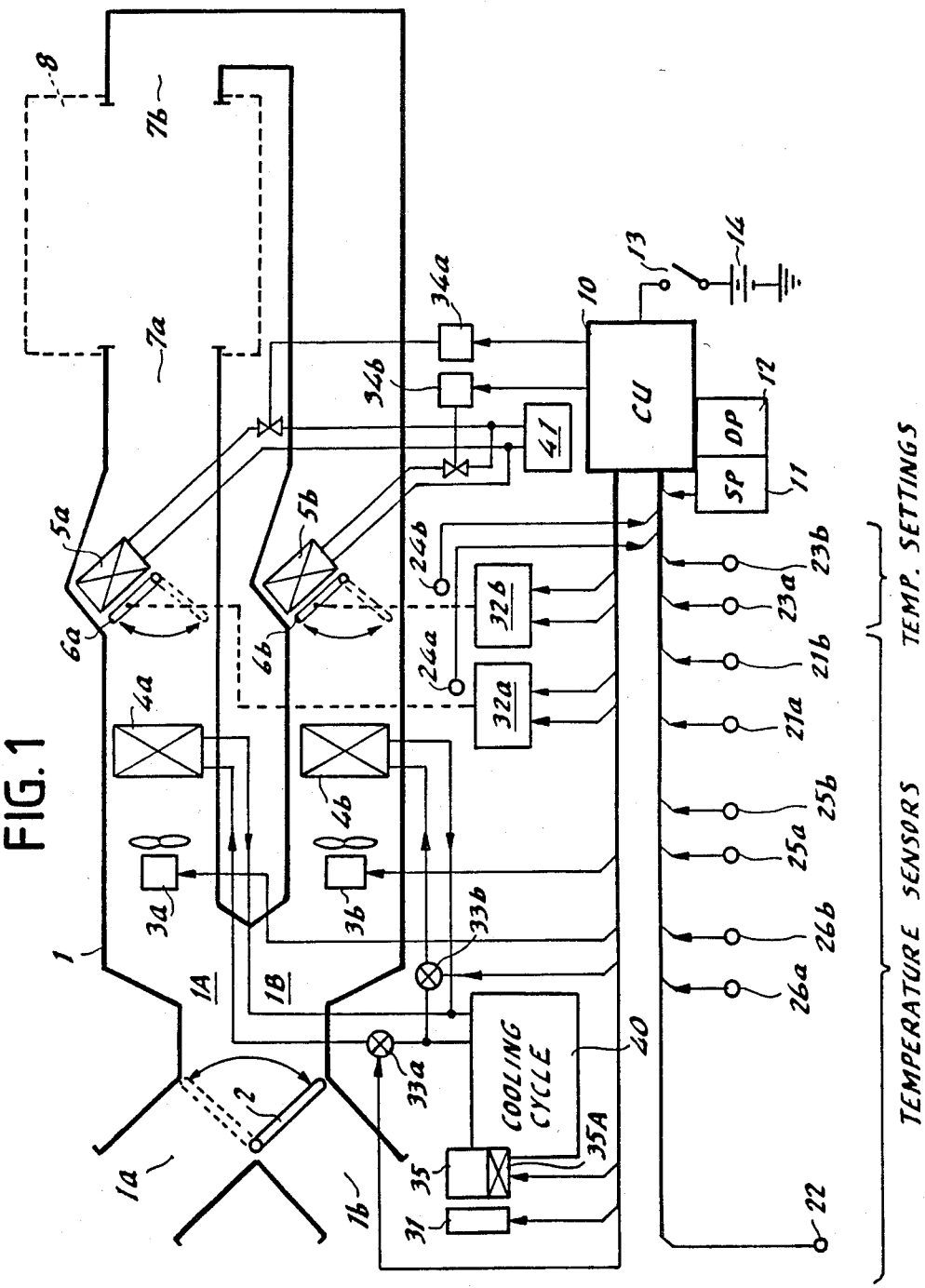
FIG. 1 is an illustration of an automotive air conditioner and its associated actuators which are controlled by an apparatus according to the present invention.

In FIG. 1, there is shown an air conditioner embodying the invention. Illustrated at 1 is an air duct having a first air inlet 1a through which outside air is taken into the conditioner and a second air inlet through which inside air is taken for recirculation. Switching between the first and second air inlets 1a and 1b is effected by a deflecting member or shutter 2. The air duct 1 generally comprises two air distribution conduits, or subsystems 1A and 1B.

The air distribution subsystems 1A and 1B include blower fans 3a and 3b, to produce air streams directed toward a front-side outlet 7a and a rear-side outlet 7b, respectively, and thence to the vehicle's passenger compartment 8, which may be partitioned into front and rear parts by means of a curtain. Evaporators 4a and 4b are respectively located in the air distribution subsystems 1a, 1b downstream of the blower fans 3a, 3b and are connected to a cooling cycle 40 a part of which is formed by a compressor 35 which is in turn coupled to the output shaft of the vehicle's engine, not shown.

Illustrated at 5a and 5b are heater cores which are located downstream of the evaporators 4a and 4b, respectively, and which are connected to the engine block 41 to transfer the thermal energy of engine coolant heated by cylinder combustion to the air streams presented to them from the evaporators. Air mixing shutters 6a and 6b are mounted respectively on the upstream side of the heater cores 5a, 5b to adjustably direct the air cooled by the evaporators 4a, 4b to the heater cores 5a, 5b in relation to the air bypassing them to the outlets 7a, 7b in response to control signals applied thereto, so that cool and warm airflows are adjustably mixed at the downwstream side of each heater core 5 to be exhausted through each outlet. Although not shown in the drawing, each of the outlets 7a, 7b is provided with one or more deflectors which can be appropriately oriented to direct the conditioned air stream in a desired direction.

A control unit 10 receives various information signals from sensors and manual controls located on the vehicle and executes on the received information according to a predetermined control algorithm and sends command signals to various actuating motors of the air conditioner to provide temperature control in various operating modes.

The sensors that sends information to the control unit 10 include a front-seat temperature sensor 21a generating a signal $Tr_1$ in response to the temperature in the front seat of the passenger compartment, a rear-seat temperature sensor 21b generating a signal $Tr_2$ in response to the air temperature in the rear seat, an ambient temperature sensor 22 generating a signal Tam representing the outside temperature, potentiometer-type angle sensors 24a and 24b for generating signals $Ar_1$ and Ar$_2$ representing the orientations of the air mixing shutters 6a and 6b respectively, sunlight illumination sensors 25a and 25b for generating signals St$_1$ and St$_2$ representing the amount of exposure to the sunlight in the front and rear seats, respectively, and evaporator temperature sensors 26a and 26b for generating signals Te representing the downstream side temperature of the evaporators 4a and 4b. The manual controls include front- and rear-seat temperature setting devices 23a and 23b and a control panel 11 having power-on and power-off switches and a plurality of mode selection switches.

The control unit 10 issues various command signals to actuators. One of such actuators is a compressor regulator 35A which is coupled to the compressor 35 to regulate its capacity to 50% of its full capacity in response to a control signal from the control unit 10. An electromagnetic clutch 31 is also responsive to a control signal from the control unit 10 to interrupt the coupling between the engine output shaft and the compressor 35. Solenoid-controlled, vacuum-operated actuators 32a and 32b are connected to the air mixing shutters 6a and 6b, respectively, to control their orientations with the aid of the engine's manifold vacuum pressure in response to air-mixing signals from the control unit 10. Other actuators include electromagnetic valves 33a and 33b located in the circulating passageways of refrigerant between the cooling cycle 40 and evaporators 4a and 4b in order to regulate the flow rate of the cool refrigerant, and electromagnetic valves 34a and 34b for regulating the flow rates of engine coolant supplied to the heater cores 5a and 5b, respectively. A display panel 12 is also responsive to outputs of the control unit 10 to provide various items of operating conditions of the air conditioner and the control unit 10 on display.

Figure 2:
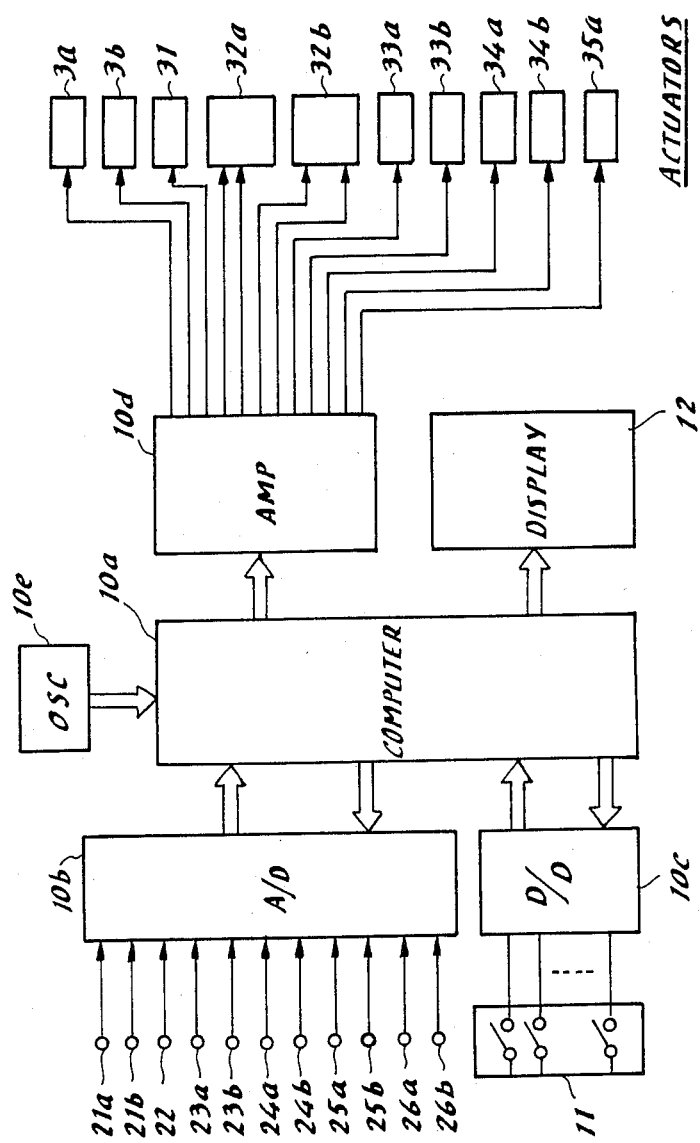
FIG. 2 is an illustration of the detail of the control unit of FIG. 1.

The control unit 10 is energized by a battery 14 when the ignition key switch 13 of the engine is switched on. As shown in FIG. 2, the control unit 10 comprises a microcomputer 10a which is driven by a clock oscillator 10e, and an analog-to-digital converter unit 10b which acts as an interface by receiving various analog signals from the sensors and setting devices mentioned above and selectively applying the received signals in digital form to the microcomputer 10a in response to a command signal therefrom. A digital interface 10c is connected between the control panel 11 and the microcomputer 10a. The command signals from the microcomputer 10a are amplified by an amplifier unit 10d and applied to the various actuators mentioned above. An initializing circuit, not shown, is also included which becomes effective in response to the turn-on of the ignition key switch 13 to initialize the operating conditions of the various internal circuits of the microcomputer 10a.

Figure 3:
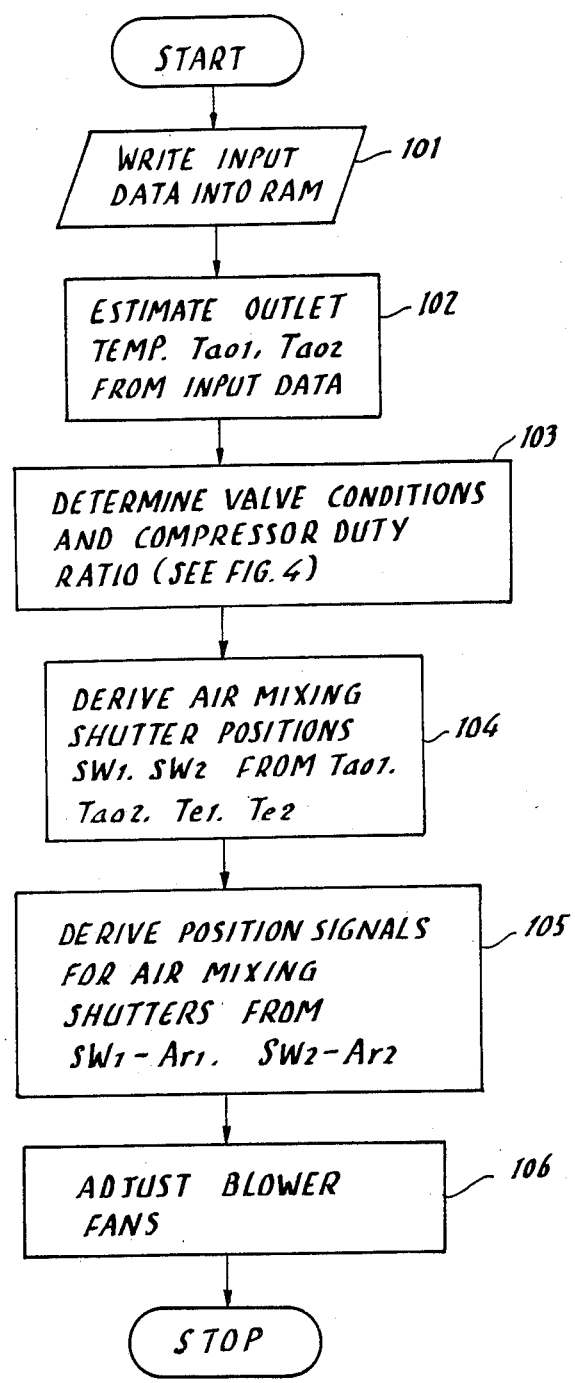
FIG. 3 is a flow diagram describing a control algorithm of the control unit.

According to the control algorithm of the microcomputer 10a, as illustrated in FIG. 3, the operation of the microcomputer 10a starts with a subroutine 101 immediately following the initializing operation just mentioned. In the subroutine 101 the microcomputer 10a receives all the input signals through the interface 10b in which the analog signals are converted to corresponding binary coded signals and written into addressible locations of a read-write memory, or random access memory and also receives digital signals from the control panel 11 and stores them into predetermined locations.

In a subroutine 102, the microcomputer 10a estimates outlet air temperatures Tao$_1$ and Tao$_2$ at the outlets 7a and 7b, respectively, by computing the following equations so that the front- and rear-seat temperatures approach the reference temperature Tset$_1$, Tset$_2$ established respectively by the front- and rear-seat temperature setting devices 23a and 23b:

$$Tao_1 = Kset_1 \times Tset_1 - Kr_1 \times Tr_1 - Kam_1 \times Tam - Ks_1 \times St_1 + C_1$$

$$Tao_2 = Kset_2 \times Tset_2 - Kr_2 \times Tr_2 - Kam_2 \times Tam - Ks_2 \times St_2 + C_2$$

where, Kset$_1$, Kset$_2$, Ks$_1$, Ks$_2$, C$_1$ and C$_2$ are constants.

In a subroutine 103, the microcomputer 10a derives duty ratios of the refrigerant control valves 33a and 33b and compressor 35 from the computed values of outlet temperatures Tao$_1$, Tao$_2$ and from the outside temperature Tam.

Figure 4:
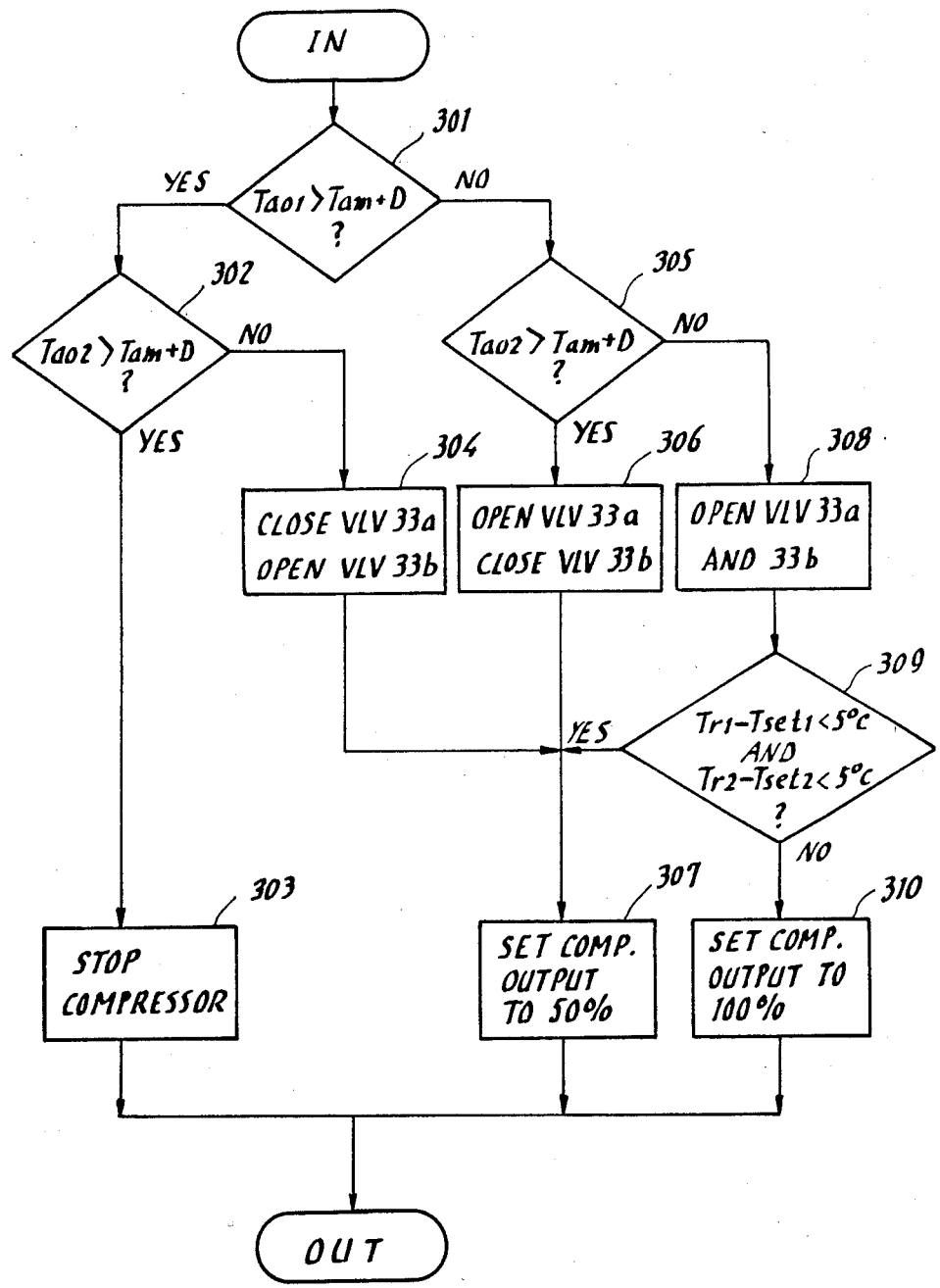
FIG. 4 is a flow diagram describing the detail of the subroutine 103 of FIG. 3.

As shown in FIG. 4, the subroutine 103 comprises a decision Step 301 in which the microcomputer compares the front-seat outlet temperature value Tao$_1$ with the outside temperature value Tam plus a constant D of a positive value and if Tao$_1$ is greater than Tam+D, the program execution exits to a Step 302 to check to see if the rear-seat outlet temperature value Tao$_2$ is greater than Tam+D. If both Tao$_1$ and Tao$_2$ are greater than Tam+D, the electromagnetic clutch 31 is decoupled from the engine output shaft to shut down the compressor 35 operation at Step 303, terminating the subroutine 103, and if not, the program execution advances to a Step 304 to shut off the front-seat valve 33a and open the rear-seat valve 33b, and then proceeds to a Step 307 to energize the compressor regulator 35A to reduce the output of the compressor 35 to a 50% value of its maximum output.

If the front-seat outlet temperature Tao$_1$ is lower than Tam+D, the execution exits from the Step 301 to a Step 305 in which the rear-seat outlet temperature Tao$_2$ is compared with Tam+D as in Step 302 and if Tao$_2$ is greater than Tam+D, a Step 306 is executed by opening the front-seat valve 33a and closing the rear-seat valve 33b, followed by the execution of the Step 307. If Tao$_2$ is detected as being lower than Tam+D in the Step 305, a Step 308 is executed by opening both valves 33a and 33b and a Step 309 is then executed.

In the Step 309, the microcomputer determines the magnitude of the difference between the front-seat actual temperature Tr$_1$ and the front-seat reference temperature Tset$_1$ by comparing the temperature difference with 5° C., or determines the magnitude of the difference between the rear-seat actual temperature Tr$_2$ and the rear-seat reference temperature Tset$_2$ by comparing the temperature difference with 5° C. If Tr$_1$−Tset$_1$ is lower than 5° C. and Tr$_2$−Tset$_2$ is also lower than 5° C., the microcomputer advances to the Step 307 to reduce the compressor output to 50% value. If either of the temperature differences is equal to or higher than 5° C., the compressor regulator 35A is de-energized at Step 310 to increase the compressor 35 output to the maximum level.

The program execution now goes to a subroutine 104 of FIG. 3 in which the microcomputer computes angular positions SW$_1$ and SW$_2$ for driving the air mixing shutters 6a and 6b, respectively, to obtain the estimated temperatures Tao$_1$ and Tao$_2$ at the outlets 7a and 7b. This computation involves executing the following equations:

$$SW_1 = (Tao_1 - Te_1)/(D_1 - Te_1) \times 100\%$$

$$SW_2 = (Tao_2 - Te_1)/(D_2 - Te_2) \times 100\%$$

where, $Te_1$ and $Te_2$ represent the temperatures of the evaporators 4a and 4b derived from the evaporator sensors 26a and 26b, respectively, and $D_1$ and $D_2$ are constants.

In the next subroutine 105, the execution involves comparing the computed position data $SW_1$ and $SW_2$ of the shutters respectively with the actual angular position data $Ar_1$ and $Ar_2$ of the air mixing shutters 4a and 4b derived from the position sensors 24a and 24b and deriving from the positional differences position control signals for application to the air mixing shutter actuators 32a and 32b so that each of the positional differences reduces to an allowable small value.

Figure 5:
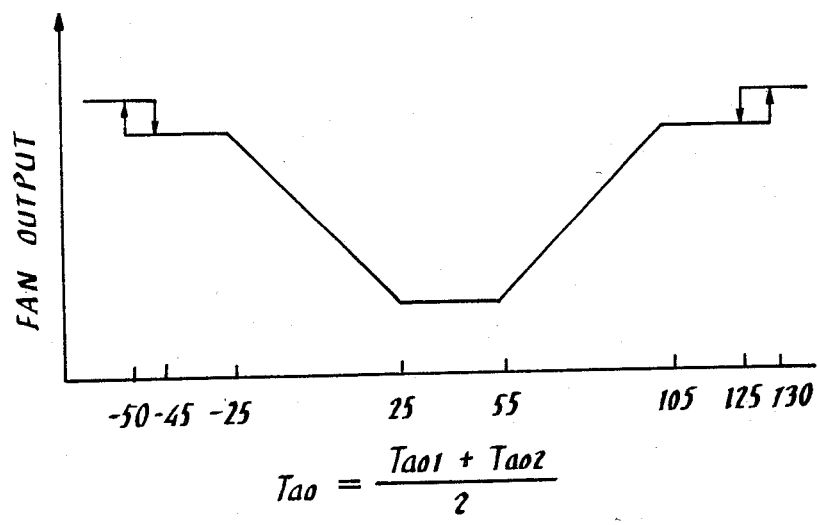
FIG. 5 is a graphic illustration of an operating characteristic employed for controlling the blower fans of FIG. 1 in response to temperature values estimated by the control unit.

The control now proceeds to a subroutine 106 to control the currents supplied to the blower fans 3a and 3b in response to the estimated outlet temperatures $Tao_1$ and $Tao_2$. The blower fans is controlled according to a characteristic shown in FIG. 5.

As the above process is repeated at high speed, the temperatures of the front and rear areas of the passenger compartment 8 approach the temperature setting values $Tset_1$ and $Tset_2$. Since the refrigerant regulating valves 33a, 33b and the compressor output power are controlled in accordance with the estimated outlet temperatures $Tao_1$ and $Tao_2$ which give the necessary thermal energy to the front and rear seat areas, the power available from the engine is utilized to the fullest efficiency and the amount of power required can therefore be kept to a minimum.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An apparatus for controlling an air conditioner mounted on an engine driven vehicle having a passenger compartment, comprising:
    means for forming first and second air distribution passageways and directing first and second air streams respectively therethrough to first and second areas of said passenger compartment;
    first and second evaporators located in said first and second passageways respectively;
    a refrigerant supply source including a variable capacity compressor for supplying refrigerant through said passageways to said evaporators;
    temperature sensors for detecting the temperatures in said first and second areas and outside said passenger compartment;
    temperature setting means for establishing reference temperatures for said first and second areas;
    control means for estimating thermal energies of said first and second air streams, delivered from said evaporators, from said detected temperatures and said reference temperatures, evaluating said estimated thermal energies to generate a first control signal when either one of said first and second areas requires a cooling demand and a second control signal when both of said areas require said demand, and causing said compressor to operate at a lower or a higher capacity in response to said first and second control signals, respectively;
    solenoid-operated clutch means for coupling said variable capacity compressor to the vehicle engine in response to each of said first and second signals and decoupling the compressor from the engine in response to the absence of said first and second signals; and
    first and second solenoid-operated valve means respectively located in said first and second passageways for controlling the flow rates of said refrigerants passing therethrough in response to said first and second control signals, respectively.

2. An apparatus as claimed in claim 1, further comprising first and second blower fans located in said first and second passageways respectively and wherein said control means is programmed to generate further signals representing said estimated thermal energies to control said first and second blower fans respectively.

3. An apparatus for controlling an air conditioner mounted on an engine driven vehicle having a passenger compartment, comprising:
    means for forming first and second air distribution passageways and directing first and second air streams respectively therethrough to first and second areas of said passenger compartment;
    first and second evaporators located in said first and second passageways respectively;
    a refrigerant supply source including a variable capacity compressor for supplying refrigerant through said passageways to said evaporators;
    temperature sensors for detecting the temperatures in said first and second areas and outside said passenger compartment;
    temperature setting means for establishing reference temperatures for said first and second areas;
    control means responsive to said detected temperatures and said reference temperatures for estimating thermal energies of said first and second air streams to be delivered from said evaporators from said detected temperatures and said reference temperatures, evaluating said estimated thermal energies to generate a first control signal when either one of said first and second areas requires a cooling demand and a second control signal when both of said areas require said demand, detecting differences between said detected temperatures and the associated reference temperatures when said second control signal is generated, detecting when both of said differences are lower than a preset temperature or not and causing said compressor to operate at a lower capacity when both of said differences are lower than said preset value or when said first control signal is generated and causing said compressor to operate at said higher capacity when both of said differences are not lower than said preset value;
    solenoid-operated clutch means for coupling said variable capacity compressor to the vehicle engine in response to each of said first and second signals and decoupling the compressor from the engine in response to the absence of said first and second signals; and
    first and second solenoid-operated valve means respectively located in said first and second passageways for controlling the flow rates of said refrigerants passing therethrough in response to said first and second control signals, respectively.

4. An apparatus as claimed in claim 3, further comprising first and second blower fans located in said first and second passageways respectively and wherein said control means is programmed to generate further signals representing said estimated thermal energies to control said first and second blower fans respectively.

5. An apparatus for controlling an air conditioner mounted on an engine driven vehicle having a passenger compartment, comprising:
- a pair of evaporators located respectively in different areas of said passenger compartment;
- a pair of conduits for supplying refrigerants to said evaporators respectively;
- a refrigerant supply source including a variable capacity compressor for supplying pressurized refrigerant through said conduits to said evaporators;
- a pair of fluid regulating means respectively provided in said conduits;
- a plurality of temperature sensors located respectively in said different areas and outside said passenger compartment;
- a pair of temperature setting means for respectively providing first and second temperature settings for said different areas;
- control means for (a) estimating temperatures of air delivered by said first and second evaporators respectively from said sensed temperatures and said temperature settings, (b) evaluating said estimated temperatures to detect a first condition in which either one of said different areas requires a cooling demand and a second condition in which both of said areas require said demand, (c) causing the regulating means associated with said one different area to pass the refrigerant and causing said compressor to operate at a lower capacity in response to said first condition, and (d) causing both of said first and second regulating means to pass the refrigerants and causing said compressor to operate at a higher capacity in response to said second condition; and
- solenoid-operated clutch means for coupling said variable capacity compressor to the vehicle engine in response to each of said first and second conditions and decoupling the compressor from the engine in response to the absence of said first and second conditions.

* * * * *